(12) United States Patent
Cennini et al.

(10) Patent No.: US 8,353,616 B2
(45) Date of Patent: *Jan. 15, 2013

(54) ILLUMINATION DEVICE

(75) Inventors: Giovanni Cennini, Eindhoven (NL);
Hugo Johan Cornelissen, Waalre (NL);
Cornelis Reinder Ronda, Aachen (DE);
Yadong Liu, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 293 days.

This patent is subject to a terminal disclaimer.

(21) Appl. No.: 12/595,052

(22) PCT Filed: Apr. 14, 2008

(86) PCT No.: PCT/IB2008/051400
§ 371 (c)(1),
(2), (4) Date: Jan. 7, 2010

(87) PCT Pub. No.: WO2008/126048
PCT Pub. Date: Oct. 23, 2008

(65) Prior Publication Data
US 2010/0110720 A1    May 6, 2010

(30) Foreign Application Priority Data

Apr. 17, 2007   (EP) .................................... 07106322
Sep. 27, 2007   (EP) .................................... 07117429

(51) Int. Cl.
*F21V 7/04*   (2006.01)
(52) U.S. Cl. ......... 362/619; 362/330; 362/606; 362/625
(58) Field of Classification Search ........ 362/97.1–97.4, 362/249.02, 311.02, 330–332, 612, 619–620, 362/625–626, 800
See application file for complete search history.

(56) References Cited

U.S. PATENT DOCUMENTS

| | | | |
|---|---|---|---|
| 4,958,913 A | 9/1990 | Schaffer | |
| 5,803,572 A | 9/1998 | Brada | |
| 6,272,269 B1* | 8/2001 | Naum | 385/43 |
| 6,814,480 B2* | 11/2004 | Amano | 362/545 |
| 6,951,403 B2 | 10/2005 | Bennett, Jr. | |
| 2003/0063459 A1 | 4/2003 | McChesney | |
| 2003/0146688 A1 | 8/2003 | Kitazawa et al. | |
| 2004/0141302 A1 | 7/2004 | Koch et al. | |
| 2004/0150714 A1 | 8/2004 | Lin | |
| 2005/0213226 A1 | 9/2005 | Waggoner et al. | |
| 2005/0270761 A1* | 12/2005 | Kung et al. | 362/33 |

FOREIGN PATENT DOCUMENTS

| | | |
|---|---|---|
| AU | 7346281 A1 | 1/1982 |
| DE | 3620746 A1 | 12/1987 |
| DE | 10261543 A1 | 7/2004 |
| DE | 202006011055 U1 | 11/2006 |
| WO | 2004059349 A1 | 7/2004 |

* cited by examiner

*Primary Examiner* — Jason Moon Han
(74) *Attorney, Agent, or Firm* — John F. Salazar; Mark L. Beloborodov (57) ABSTRACT

The invention relates to an illumination device (10) for illuminating a surface (101), with at least one lighting element (20) and an illuminating body (30), wherein the lighting element (20) emits an artificial light (21,21), a housing element (40) comprises the lighting element (20) and supports the illuminating body (30), the illuminating body (30) comprises a transparent light conductive material suitable to illuminate the surface (101) lying subjacent. The invention discloses, that the illuminating body (30) comprises a surface pattern (80), forming a Fresnel-type lens to optically magnify the surface (101).

16 Claims, 8 Drawing Sheets

ILLUMINATION DEVICE

FIELD OF THE INVENTION

This invention relates to an illumination device for illuminating a surface, with at least one lighting element and an illuminating body, wherein the lighting element emits an artificial light, a housing element comprises the lighting element and supports the illuminating body, the illuminating body comprises a transparent light conductive material and is generally overlying the surface, being illuminated.

BACKGROUND OF THE INVENTION

In the U.S. Pat. No. 6,951,403 B2 a device for illuminating a generally flat surface is described, which comprises a battery operated light source contained within a housing to which a transparent light conductive illuminating body is mounted. The device may be placed with the illuminating body over a book or other flat surfaces for illuminated viewing through the transparent illuminating body. The illuminating body is tapered in a wedge shape to deflect the conducted light onto the underlying surface. Unfortunately, the described device is less convenient for reading books, which possess in general a curved reading area. The interaction of the curved reading area with the tapered illuminating body leads to a deformed image of the illuminated page. In addition, the device is a relatively thick wedge shaped light guide where the thickness results in relatively high weight and this reduces ease of use. It also results in a relatively high mechanical stiffness making it very difficult to bend the device over a curved reading area.

Furthermore, there are magnification lenses known, which can be clipped onto the illumination devices described above. Unfortunately, such magnification elements possess a relatively small magnification. Another option to optically magnify a surface is to use a bar magnifier. This bar magnifier is often an acrylic body, possessing a curved top surface and thereby optically magnifying the surface on which the bar magnifier is lying. The disadvantage of such bar magnifier is their weight and the distortion of the image.

SUMMARY OF THE INVENTION

Thus, the invention has for its object to eliminate the above mentioned disadvantages. In particular, it is an object of the invention to provide an efficient and cheap illumination device, which combines a sufficient magnification for convenient reading with a small overall thickness.

This object is achieved by an illumination device for illuminating a surface with at least one lighting element and an illuminating body, wherein the lighting element emits an artificial light, a housing element comprises the lighting element and supports the illuminating body, the illuminating body comprises a transparent light conductive material suitable for illuminating the surface lying subjacent, characterized in that, the illuminating body comprises a surface pattern forming a Fresnel-type lens to optically magnify the surface. Advantageous embodiments of the illumination device for illuminating a surface are defined in the subclaims.

Within the scope of the invention, a lighting element and an illuminating body are disclosed, wherein the illuminating body comprises a Fresnel-type lens. By breaking the lens into a set of refractor means a Fresnel-type lenses achieve a high magnification with a reduced amount of material needed compared to conventional spherical lenses. As each refractor means itself forms a spherical lens, the combination of all refractor means leads to a large area magnification lens, which possesses a small thickness. As effectively the continuous surface of a standard lens is chopped into a set of surfaces of the same or different curvature, the overall thickness of the lens is decreased, allowing a substantial reduction in thickness of the lens. These refractor means may have straight or curved profiles with constant or random spacing and may even vary from microns to millimeters in dimension. The arrangement of the refractor means and therefore the configuration of the surface pattern may be circular, linear or have a non uniform pattern.

Furthermore, the refractor means may possess a cross-section which is equal to a line-up of small triangles, trapeze or parallelograms. The refractor means may possess a homogeneous design throughout the surface of the illuminating body. In another preferred embodiment the design of the refractor means may change along the main axis of the illuminating body.

In another preferred embodiment each refractor means comprises a saw tooth like cross-section. To achieve the needed magnification each refractor means comprises a facet surface and a relief surface. The facet surface ramps upwards as the distance to an optical axis decreases. Subsequent, the relief surface sharply falls towards a base of the surface pattern. So the saw tooth like structure is built, possessing a triangular shape. The angle between the base of the surface pattern and the facet surface may be between 0° to 30°, and with bigger diameter lenses it may even extend to 40° and even 50°. The pitch of the saw-tooth like structure may be between 1 mm and 10 microns, more preferably between 200 microns and 50 microns to render it invisible to the human eye.

The disclosed illumination device comprises the ability to illuminate and to optically magnify a surface. As used as a reading and magnifying lamp, the illuminating body of the illumination device is generally overlying the surface being illuminated while the Fresnel-type lens is optically magnifying the surface. Therefore in another preferred embodiment the surface pattern is arranged on one of the surfaces of the illuminating body. Preferably the surface pattern covers the top or bottom surface of the illuminating body. If—for example—a user wants to read a book the illuminating body has to be held above the pages so that the text can optically be magnified. As the magnification is a function of the distance between the object—e.g. the text—and lens and the focal distance of the lens, the illuminating body has to be held above the object in distance between 10 mm and 100 mm to achieve a magnification between 1.15 and 8 times, if the lens possesses a focal distance between 50 mm and 300 mm. In another preferred embodiment the illuminating body and the surface pattern are one-piece.

In another preferred embodiment the surface pattern is configured on the one hand to optically magnify the surface and on the other hand to receive and to deflect the artificial light emitted by the lighting element onto the surface. The disclosed illumination device combines the ability to illuminate and to magnify the surface. If the lighting element of the disclosed illumination device is arranged on one of the side surfaces of the illuminating body it injects the artificial light into the illuminating body. The grooves that constitute the surface pattern act as a light extraction feature. The artificial light is collected within the illuminating body and leaves it through the relief surface of the surface pattern. So a homogeneous illumination of the surface lying beneath the illuminating body is possible. This ability is combined with the magnification of the surface.

If a normal light source is used for reading e.g. a book, it may disturb other people, especially if used in bedrooms. To avoid disturbing other people, the illumination device described in this invention may be used as a reading light. Therefore it is important, that the emitted artificial light illuminates just the page of the book and not the surrounding. Thus, the lighting element should be mounted to one of the side faces of the illuminating body. The light injected into one of the side faces has to be deflected, so that as much light as possible leaves through the bottom side of the illuminating body, being above the sheet of e.g. the book. Therefore, the surface pattern which deflects the artificial light has to be transparent for the light reflected by the surface of the sheet, so that the text, being covered by the illuminating body is lighted up and can easily be viewed by a person. Additionally, the surface pattern may be transparent for an ambient light, falling onto the light extraction layer.

As has been described, the lighting element may be arranged on one of the side faces of the illuminating body. To achieve a crossover of the artificial light emitted by the lighting element into the illumination body with a low attenuation, the lighting element may be glued onto the side face of the illuminating body. Preferably the used glue possesses the same index of refraction as the material of the illuminating body. Therefore no scattering, deflection or attenuation will occur. In another preferred embodiment the lighting element is arranged adjacent to the side face of the illuminating body, but an illumination gap is arranged between the lighting element and the side face. In this arrangement a fraction of the artificial light is injected into the illumination body, whereas the other fraction is directly illuminating the surface, lying beneath the illumination device. The fraction of light not injected into the illumination body, but directly illuminating the surface is determined by the size of the illumination gap. Furthermore, to increase or decrease the fraction of artificial light directly illuminating the surface an additional lens may be mounted within the lighting element. This lens may focus or disperse the artificial light.

Preferably, the lighting element is at least one of the following: a LED, an OLED, an incandescent lamp or a fluorescent lamp. Depending on the type of usage of the illumination device, a single or a plurality of lighting elements can be used. A light emitting diode (LED) is a semiconductor device that emits incoherent narrow spectrum light (typically in the order of 10-20 nm) when electrically biased in the forward direction. The color of the emitted light depends on the composition and the condition of the semiconducting material used. Moreover, phosphor converted LEDs can be used. In that case, also the phosphor(s) influence(s) the color and spectrum of the emitted light. The also applicable organic light emitting diode (OLED) is a special type of a LED, in which the emissive layer comprises a thin film of certain organic components. The advantage of the OLED is that it is a homogeneous large area light source with potentially low costs and high efficiency. The OLEDs utilize current flowing through a thin film of organic material to generate the light. The color of light being emitted and the efficiency of the energy conversion from current to light are determined by the composition of the organic thin film material.

In a preferred embodiment the illuminating body covers an area, respectively comprises a size of at most 300 $cm^2$, preferably less than 100 $cm^2$. If the illuminating device is used as a reading light, it has to be small and lightweight, so that it can be conveniently used. As perception research has shown, a lit area of about 1 cm×5 cm is already convenient for reading. As a result, LEDs with a power consumption of less than 50 mW, preferably less than 10 mW are sufficient to achieve an illumination level of preferably 25-2000 lux, more preferred 50-250 lux and most preferred larger than 75 lux.

In another preferred embodiment the lighting element is arranged beneath the illumination body. In this arrangement the artificial light is not injected into the illumination body but illuminates the surface directly. To focus the artificial light onto the surface a lens may be embedded into the lighting element. This embodiment has the advantage that no optically difficult connections between the lighting element and the illuminating body have to be established. Furthermore, the material used for the surface pattern has not to be chosen with respect to its ability to receive and to deflect the artificial light. Thus, a cheap and simple illumination device is achieved, which can be used to optically magnify and illuminate even a large surface.

In another preferred embodiment the illuminating body comprises a light extraction layer, configured to receive and to deflect the artificial light from the lighting element onto the surface. In this embodiment the ability of the surface pattern to receive and to deflect artificial light is enhanced by the light extraction layer. Preferably the light extraction layer covers the top side of the illuminating body not facing the surface, whereas the surface pattern covers the bottom side of the illuminating body next to the surface to be illuminated. In this configuration the surface pattern optically magnifies the surface, whereas the light extraction layer deflects the artificial light being injected from one of the side surfaces of the illuminating body. Due to the assignment of individual tasks, the surface pattern as well as the light extraction layer can be optimally designed. To use the illumination device as a reading light, the light extraction layer which deflects the artificial light has to be transparent for the light reflected by the surface of the sheet.

In another preferred embodiment the illumination body comprises a first section and a second section, wherein at least a part of the first section is covered with the surface pattern and wherein at least a part of the second section is covered with the light extraction layer. In contrast to the above described embodiments the parts of the illuminating body which are covered with the light extraction layer and the surface pattern are disjunctive. If used as a reading light the illuminating body may comprise an inner segment, which is the first section, covered with the surface pattern and therefore magnifying the surface lying beneath the illumination device. This first section may be surrounded by the second section, used to receive and to deflect the artificial light emitted by the lighting element. To achieve a homogeneous illumination of the surface, the surface structure of the light extraction layer may deflect the artificial light in such a way, that it leaves the illuminating body under an angle, heading towards the center of the illuminating body and therefore illuminating the surface lying beneath the first section. This embodiment has the advantage that different materials can be used for the first respectively second section.

In another preferred embodiment a plurality of lighting elements are positioned on the outer edge of the illuminating body. Thus, a homogeneous illumination of the illuminating body and/or the surface is achievable. The artificial light emitted by each of the lighting elements may either be directly emitted onto the surface or be injected into the illumination body, and afterwards deflected onto the surface. These embodiments have the advantage that because of the large number of lighting elements used, each of the lighting elements may possess just a small light output. Therefore the produced heat and the needed energy consumption of each lighting element is small. Furthermore, due to the reduced size of the lighting elements the rim, bearing the illuminating body and containing the lighting elements, may be small. Therefore a convenient handling of the illumination device is possible.

The object of the invention is also achieved by a mounting to bear an illumination device according to the described embodiments, wherein the mounting positions the illumination device in a distance from the surface, so that the surface can be viewed magnified. Therefore the mounting has to have a mounting means to which the illumination device is connected. The mounting means may be a clip like connection, enabling the illumination device to be connected and disconnected to the mounting means as required. Furthermore, the mounting means may comprise a distance element, positioning the illumination device within a distance from the object to be viewed, so that the desired magnification is achieved by the surface pattern.

To modify the illumination device as a torch like device, the invention discloses a condensor element. The condensor element uses that part of the artificial light not reaching and/or not directed at the surface. So, the condensor element is configured to receive and to direct at least a part of the artificial light leaving the illuminating body. To achieve this aim, the condensor element is an optical system, which may be formed of a single or a plurality of lenses and/or mirrors. The artificial light leaving the illuminating body through one of its outer surfaces may possess a diffuse distribution. The condensor element is able to reshape the flux of the artificial light to achieve a focussed and/or a parallel beam. With the help of the condensor element the disclosed illumination device can not only be used as a reading light but also as a torch.

Depending on the type of use the condensor element may be arranged on different outer surfaces of the illuminating body. Preferably, the condensor element is arranged on a longitudinal side of the illuminating body, so that the artificial light leaving these longitudinal sides may be reshaped. As the artificial light leaving the illuminating body through the bottom side may possess just a small defection angle with respect to the illumination device, it is also possible that the condensor element collects and reshapes parts of this light. Therefore, the condensor element may possess a size larger than the height of the illuminating body.

To achieve the reshaping of the light flux of the artificial light the condensor element may comprise a surface formation. The surface formation may cover large parts of the condensor element, especially those parts of a condensor element which are not in direct contact with the illuminating body. Artificial light leaving the illuminating body through the longitudinal side may therefore directly cross into the condensor element. The last named element may comprise a light conductive material, so that the artificial light is guided without attenuation. The light conductive material of the condensor element may be the same as the one used for the illuminating body.

The surface formation is able to focus or to shape the artificial light in a parallel manner. To achieve this aim, the surface formation may comprise a cross section, which is saw tooth like, ramping downwards as the distance from a centre of the condensor element increases. Each element of the surface formation may possess a width between 10 micrometer and 10 mm, preferably between 30 µm and 3 mm, most preferably between 100 µm and 1 mm. The formation angle between the condensor element and the downward ramping side of the surface formation may be between 0.1° and 5°, preferably between 0.2° and 3°, more preferably between 0.25° and 2°. This surface formation may also be arranged in such a way, that it forms a Fresnel-type lens.

In another preferred embodiment the condensor element is reversibly attachable to the illuminating body. This enables a user to use the illumination device for two different purposes. On the one hand the illumination device may be used as a reading light, illuminating a page of a book. On the other hand it is possible to attach the condensor element to the illumination device to achieve a torch like device, which is able to illuminate an arbitrary spot in the surrounding. Preferably the condensor element comprises a clip means, wherein the clip means is concurring with a second clip means of the illuminating body to attach the condensor element to the illuminating body. Through the use of the two said clip means it is possible to easily attach the condensor element to the illuminating body. A user is able to attach and/or to detach the condensor element without the need of a tool or other elements.

In another preferred embodiment the condensor element comprises a changeable lens element. With the help of the changeable lens element the receiving and directing of at least a part of the artificial light can be adjusted. So it is possible, to shape the flux of artificial light in different ways. If needed either a focussed light spot is achievable or the light flux may be arranged in a parallel manner to illuminate a larger area. Preferably, the changeable lens element is formed by a LC (Liquid Crystal) structure.

To achieve a uniform illumination in combination independent of the position of the illumination device another embodiment of the invention discloses, that the illumination device comprises at least a first lighting means and a second lighting means, wherein the first lighting means and the second lighting means are arranged to illuminate at least partially different sections of the surface. The first lighting means and second lighting means are used to illuminate the surface. To achieve this aim, they either guide artificial light emitted by the lighting element or they form the lighting element and emit the artificial light themselves. A user, who wants to vary the distance of the illumination device from the surface, may choose which of the two lighting means shall illuminate the surface. As the first and second lighting means are arranged at variable distances from the center of the Fresnel lens, they illuminate at least partially different sections of the surface. This has the advantage that the light sources give a uniform distribution of light, for different positions of the lens with respect to the object to be illuminated. Depending on the distance the user arranges the illumination device, a user may choose between the first and/or the second lighting means.

In an advantage embodiment, the first lighting means and the second lighting means are arranged between the refractor means. Although the illuminating body comprises a transparent light conductive material, it may attenuate the flux of artificial light emitted by the lighting element. Therefore, it might be appropriate to integrate the first lighting means and the second lighting means within the refractor means. For the prevention of disturbing the overall image quality, the first and/or second lighting means have to have a tiny diameter and must be arranged in refractor means which are far away from the focus of the Fresnel-type lens. Diameters in the range between 1 µm and 1 mm have proven to be advantageous.

In another embodiment the first lighting means and the second lighting means are arranged within the illuminating body. This embodiment has the advantage that the requirements concerning size and position for the first and second lighting means are less strict with respect to the embodiment described above. Therefore, even macroscopic first and second lighting means can be embedded within the illuminating body to illuminate different sections of the surface, depending on the distance of the illumination device from the surface.

According to another preferred embodiment the first lighting means and/or the second lighting means are optical fibers. In this embodiment the optical fibers are used to conduct the artificial light emitted by the remotely placed lighting element. As optical fibers possess a thin diameter they can be winded along the groves of the Fresnel-lens. The lighting element may possess a lighting system, so that the injection of the artificial light into the first and/or second lighting means can be controlled. Depending on the distance of the illumination device to the surface either the artificial light is injected into the first or second lighting means. A cladding, surrounding an inner core of the optical fiber may be incomplete, so that the artificial light is able to leave the optical fiber on dedicated spots to illuminate the surface.

The used optical fiber may be a cylindrical dielectric waveguide that transmits light along its axis, by the process of total internal reflection. The optical fiber consists of a core surrounded by a cladding layer. The boundary between the core and cladding may either be abrupt, in step-index fiber, or gradual, in graded-index fiber. The operating principle of the used optical fiber applies to a number of variants, including multi-mode optical fibers or single-mode optical fibers. Depending on the type of use of the illumination device, the optical fiber may be made of a glass or a polymer. An optical fiber made out of a plastic, is commonly a step-index multi-mode fiber, with a core diameter of 1 mm or larger. Plastic optical fibers often suffer a much higher attenuation than glass fibers, which limits the range of an apparatus using such kind of optical fibers. Often the inner core of the optical fiber is made out of a Polymethyl methacrylate (acrylic) and that cladding material is a fluorinated polymer. Furthermore, optical fibers are based on a perfluorinated polymer (mainly polyperfluorobutenylvinylether).

To achieve a more comfortable light for reading the first lighting means and/or second lighting means may be doped with a color means, wherein the color means shifts the wavelength of the artificial light by absorption and reemission. The color means may comprise a phosphor, which shifts a blue light carried by the optical fiber to other wavelength. Furthermore, the optical fibers may be cladded with a phosphor layer to achieve the same object. Alternatively, the color means may be arranged in small cavities inside the illumination body.

To minimize glare effects and to suppress a part of the artificial light to directly strike a user a reflecting means may be used. This is formed in such a way, that it reflects artificial light emitted by the first and/or second lighting means in a direction not leading to an illumination of the surface. The reflecting means may be a mirror and/or a reflective coating. The coating may be superimposed onto the optical fibers, so that artificial light emitted by the first and/or second lighting means is reflected onto the surface. Furthermore, the reflecting means prevents that the artificial light—emitted by optical fibers embedded in the refractor means—is injected into illuminating body, as this might irritate a user of the illumination device.

The aforementioned illuminating device, as well as claimed components and the components to be used in accordance with the invention in the described embodiments, are not subject to any special exceptions with respect to size, shape, material selection. Technical concept such that the selection criteria are known in the pertinent field can be applied without limitations. Additional details, characteristics and advantages of the object of the present invention are disclosed in the subclaims and the following description of the respective figures—which are an exemplary fashion only—showing a plurality of preferred embodiments of the illumination device according to the present invention.

DETAILED DESCRIPTION OF EMBODIMENTS

Figure 1:
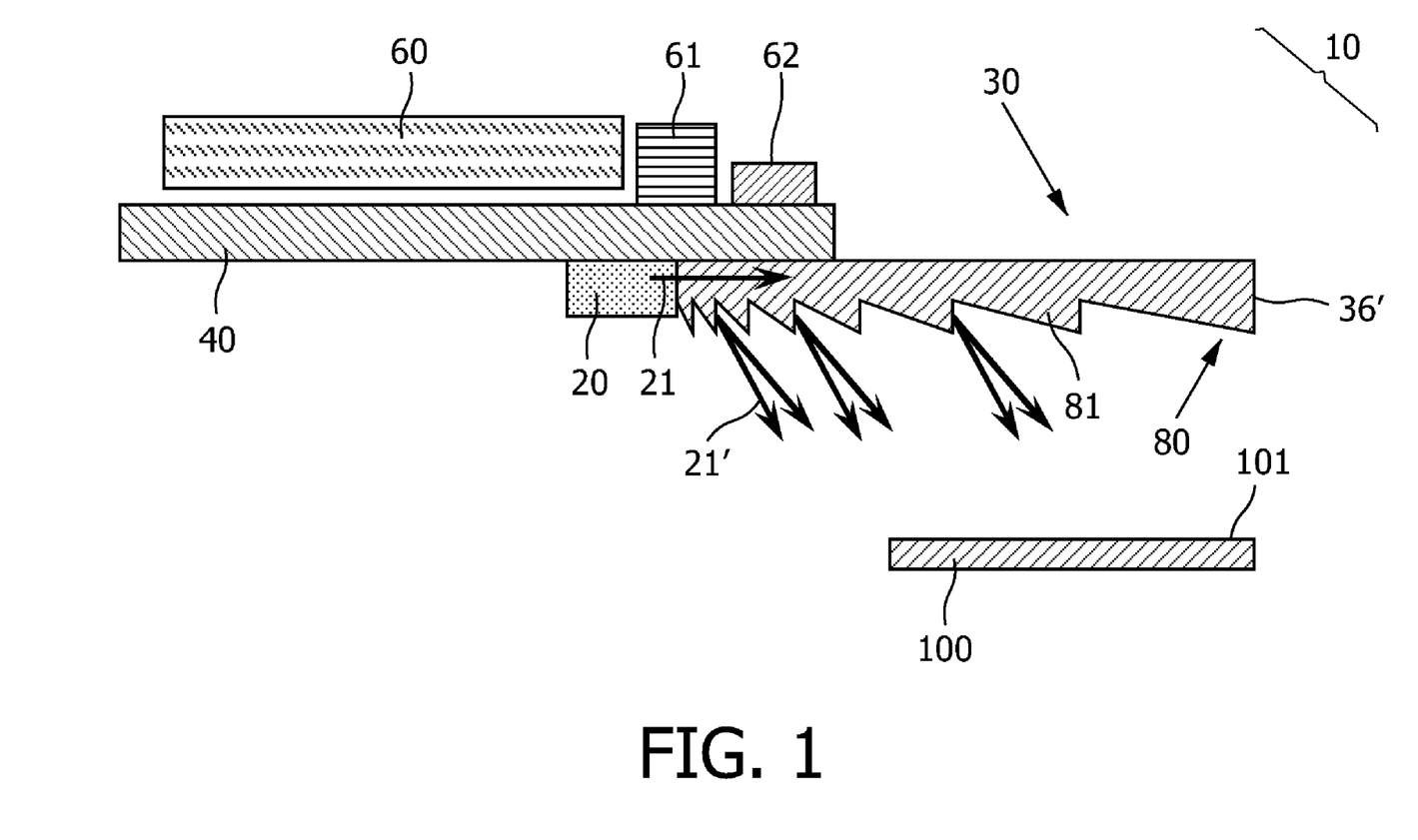
FIG. 1 shows an illumination device with an illuminating body and a lighting element.

In FIG. 1 an illumination device 10 for illuminating a surface 101 of an object 100 is shown. The illumination device 10 comprises a lighting element 20 and an illuminating body 30. The lighting element 20 is arranged subjacent to a housing element 40, which supports the illuminating body 30. In the shown embodiment the illumination device 10 is a reading light, used to illuminate the generally flat surface 101 of the object 100, such as a page of a book lying subjacent to the illuminating body 30. To optically magnify the surface 101 the illuminating body 30 comprises a surface pattern 80 forming a Fresnel-type lens. Such Fresnel-type lenses can achieve a large magnification without the need of a rather thick illumination body 30.

The lighting element 20 is a LED, which injects the artificial light 21 into the illuminating body 30. The lighting element 20 is connected with the holding element 40, which may be a printed circuit board (PCB). Such printed circuit boards are used to mechanically support and electrically connect electronic components, using conductive pathways, etched from copper sheets laminated onto a non-conductive substrate. Such structures are known to be inexpensive and highly reliable. Furthermore, the LED can directly be connected to the electronic components with the help of the PCB. Opposite to the lighting element 20 a driver 62 and a battery 61 are installed on the housing element 40. The battery 61 is preferably rechargeable and delivers the needed current for the lighting element 20. The driver 62 may include a current amplifying circuit and a waveform generating and controlling circuit, which outputs the desired waveform. Also, the waveforms amplitude, frequency and duty ratio are adjusted by the waveform generating and controlling circuit.

To use the illumination device 10 in regions of the earth, where electrical power is difficult to get or expensive, a solar cell 60 may be embedded onto the housing element 40. The solar cell 60 converts photons from the solar light into electricity, stored in the rechargeable battery 61. So if the illumination device 10 is exposed to solar light during the daytime, the illumination device 10 can be used in the dark. To gain an illumination device 10 which in spite of the solar cell 60 is able to illuminate the surface 101 for a long period of time, a lighting element 20 with low power consumption is needed. LEDs have been shown to be appropriate, because they achieve a sufficient light level with low power consumption.

As has been experimentally measured, the surface pattern 80 not only leads to an optical magnification of the surface 101, but also to a guiding of the artificial light 21, injected by the lighting element 20. Therefore the surface pattern 80 of the illuminating body 30 satisfies two tasks. On the one hand the surface pattern 80 optically magnifies the surface 101. On the other hand the surface pattern 80 is formed by a plurality of refractor means 81, possessing a light extraction feature. The artificial light 21 is bunched towards the refractor means 81 and emitted onto the surface 101. Therefore the named surface 101 is illuminated and at the same optically magnified.

To reduce the amount of artificial light 21, not being deflected onto the surface 101 but scattered in the surrounding, the invention discloses a light extraction layer 50. The configuration of the light extraction layer 50 is shown in the FIGS. 2 and 3, the last only illustrating the illuminating body 30. The artificial light 21 is injected from the left side into the illuminating body 30. To deflect the artificial light 21 onto the surface 101, being positioned subjacent to the illumination body 30 the light extraction layer 50 possesses a surface structure. This surface structure comprises a plurality of deflection means 51, which are arranged in a consecutive manner. Each deflection means 51 may possess a saw tooth like cross-section with a flange 53, sharply rising from the illuminating body 30. Subsequent, the deflection means 51 possesses a face 52, which ramps downwards as the distance to the lighting element 20 increases. The face 52 possesses an angle 54, measured with respect to the longitudinal extension of the illuminating body 30. Depending on the wavelength of the artificial light 21 and on the index of refraction of the material used for the illuminating body 30 the angle 54 should be between 0.1° to 5°, preferably between 0.25° and 2°.

Figure 2:
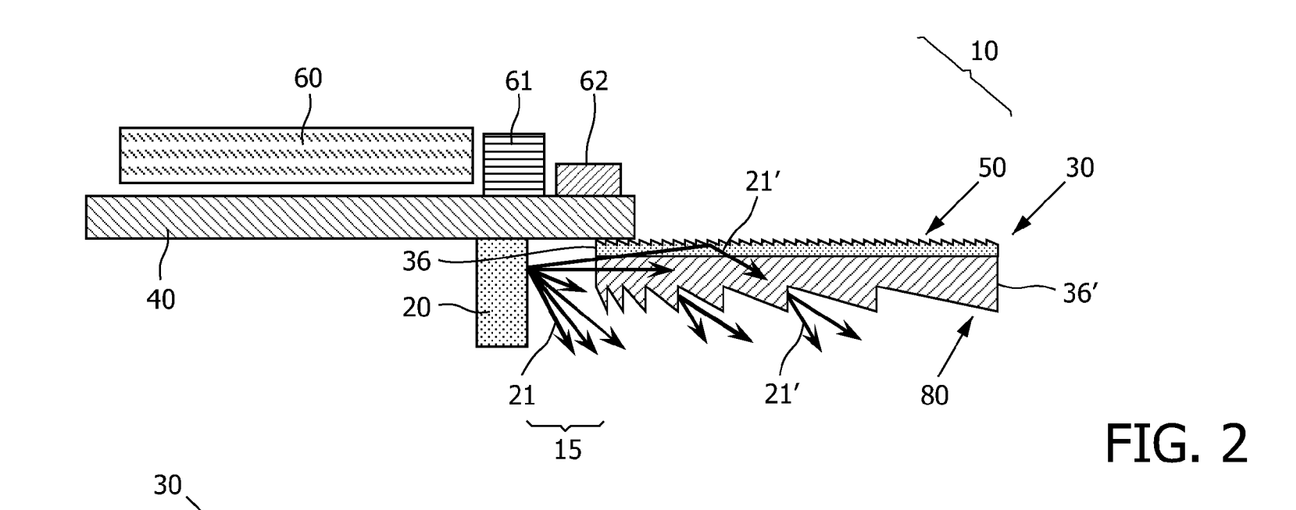
FIG. 2 shows the illumination device with an illumination gap between the lighting element and the illuminating body.
Figure 3:
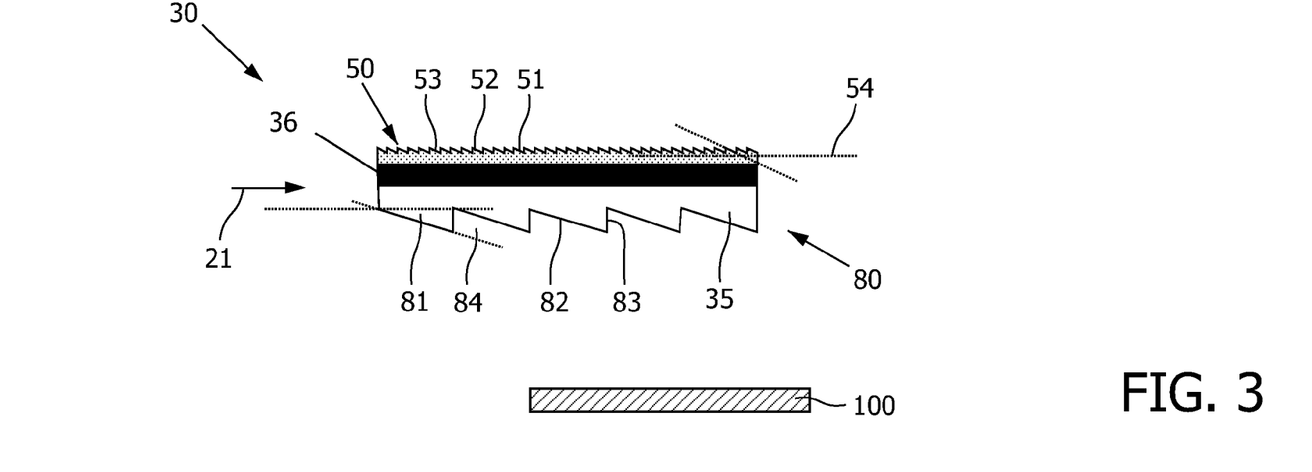
FIG. 3 shows a cut-out of the illuminating body of FIG. 2.

The surface pattern 80, needed to enlarge the appearance of the surface 101, comprises a plurality of refractor means 81. Each refractor means 81 is arranged in a consecutive manner covering a bottom surface 35 of the illuminating body 30. In the shown embodiment each refractor means 81 possesses a saw tooth like cross-section with a flange 83, sharply rising from the illuminating body 30. Subsequent the refractor means 81 possesses a facet surface 82 which ramps downwards as the distance to the lighting element 20 decreases. Therefore the saw tooth like structure is inverse to those of the extraction layer 50. To achieve a homogeneous magnification of the surface 101 the refractor means 81 may be arranged in a non homogeneous manner. Furthermore, the angle 84 between the facet surface 82 and the longitudinal axis of the illuminating body 30 may change with respect to the distance to the lighting element 20. The refractor means 81 may be arranged in a linear structure, so that the surface pattern 80 may comprise of a plurality of rows of refractor means 81. In another embodiment the surface pattern 80 may comprise a plurality of concentric annular arranged refractor means 81. The so formed Fresnel lens may also be corrected for spherical aberration.

The lighting element 20 shown in FIG. 2 is not in direct contact with the illuminating body 30. Rather than that, an illumination gap 15 is arranged between the lighting element 20 and the side face 36 of the illuminating body. Therefore a part of the artificial light 21' will be injected into the illuminating body 30. The other part of the artificial light 21 will be directly emitted onto the surface 101. This embodiment has the advantage that direct light 21 as well as indirect light 21' are used to illuminate the surface. This results in a very homogeneous illumination, enhancing the contrast and the readability of a book lying beneath the illumination device 10.

Figure 4:
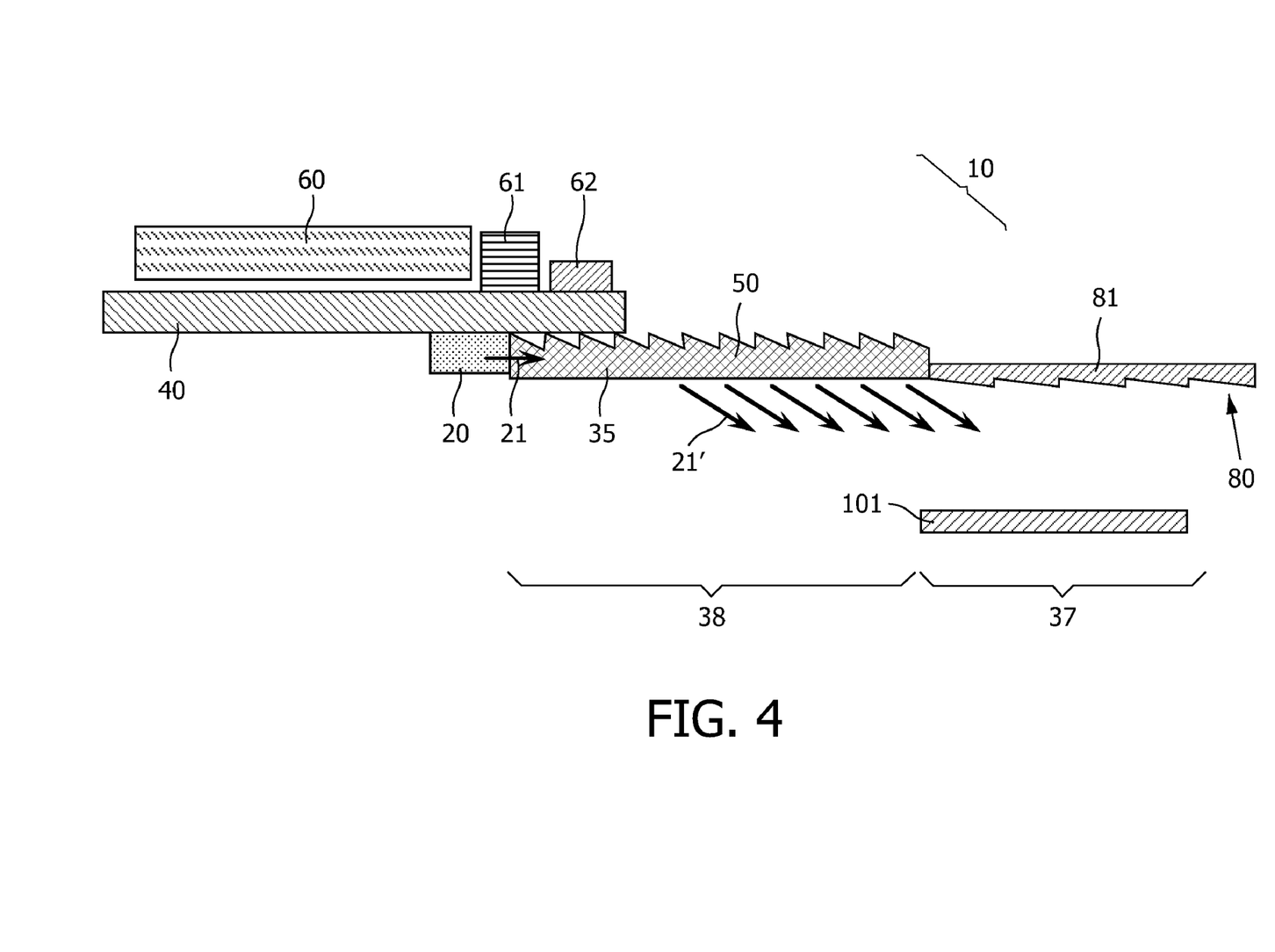
FIG. 4 shows another embodiment of the illumination device.
Figure 5:
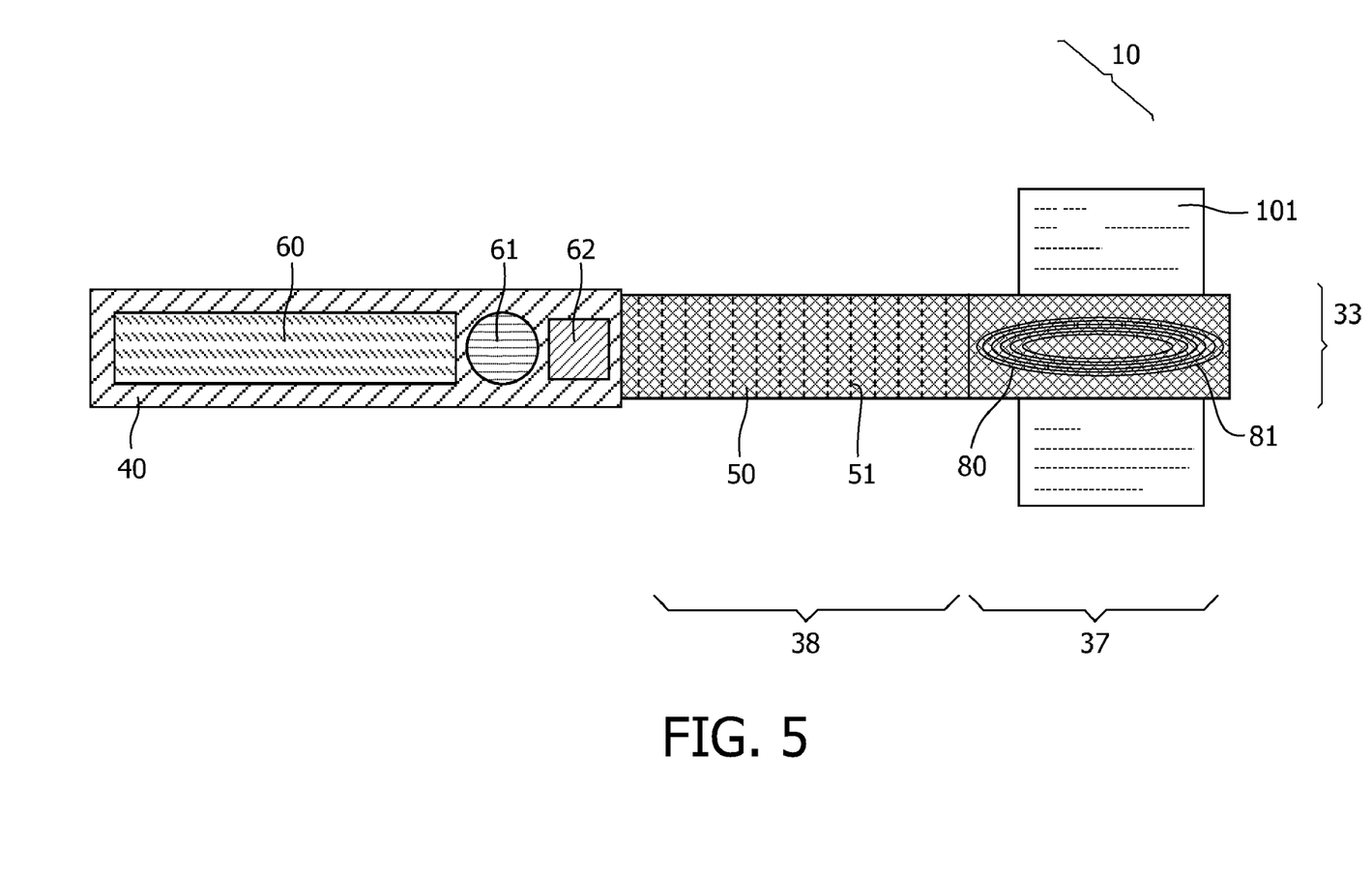
FIG. 5 shows a top view of the illumination device of FIG. 4.

In FIG. 4 another embodiment of the illumination device 10 is shown. The illuminating body 30 is divided into a first section 37 and a second section 38. The underside of the first section 37 of the illuminating body 30 is covered with the surface pattern 80, forming a Fresnel-type lens. Therefore an object 100, lying beneath the first section 37 is optically magnified. To illuminate the object 100 respectively the surface 101, the second section 38 of the illuminating body 30 comprises a light extraction layer 50. Artificial light 21 being injected into the illuminating body 30 is received and deflected by the light extraction layer 50 and guided onto the surface 101. As the surface 101 is lying beneath the first section 37 and not beneath the second section 38, the artificial light 21' is deflected sidewise. As FIG. 4 illustrates the deflected artificial light 21' is emitted from the second section 38 but illuminating the surface 101 lying under the first section 37. This arrangement is clarified by FIG. 5, showing an oversight of the illumination device 10 of FIG. 4. The object 100 with its surface 101 is lying underneath the first section 37 of the illuminating body 30. Onto respectively within the illuminating body 30 the refractor means 81 of the surface pattern 80 are arranged in a concentric annular way. As the illuminating body 30 possesses a width 33 which is smaller than the size of the surface 101 only the underlying part of the surface 101 is optically magnified by the Fresnel-type lens. To illuminate the surface 101 the second section 38 is covered with the light extraction layer 50.

Figure 6:
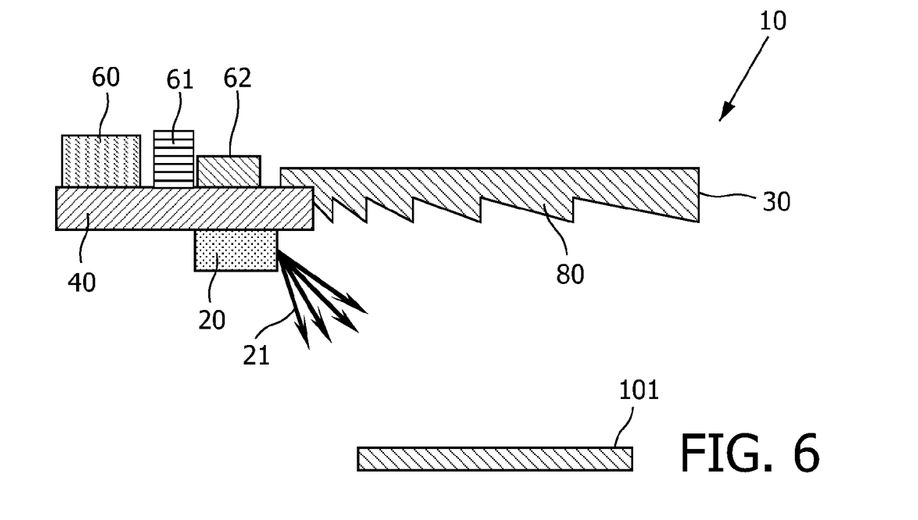
FIG. 6 shows another embodiment of the illumination device.

The illumination device 10 shown in FIG. 6 comprises a lighting element 20 which is arranged adjacent to the housing element 40. The artificial light 21 emitted by the lighting element 20 is not injected into the illumination body 30. Rather than that, the artificial light 21 directly illuminates the surface 101. Therefore no adaptation between the lighting element 20 and the illuminating body 30 to prevent absorption of the artificial light 21 has to be done. Furthermore an exchange of the lighting element 20 can be done easily and does not need any dissembling of the whole illumination device respectively illuminating body 30.

Figure 7:
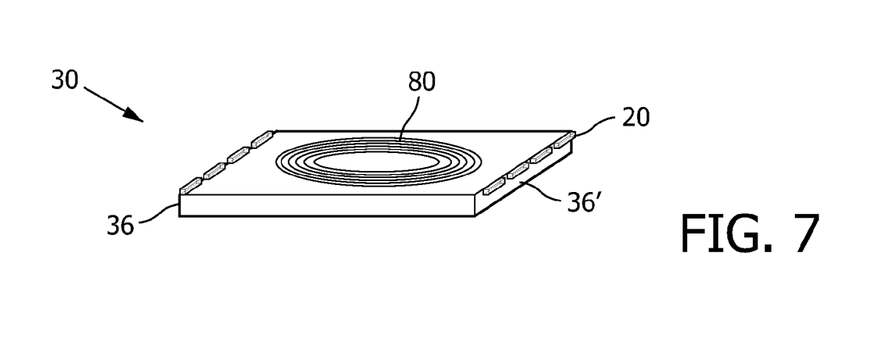
FIG. 7 shows the illuminating body with two rows of the lighting elements and FIG. 8 shows the illuminating body surrounded by a plurality of lighting elements.
Figure 8:
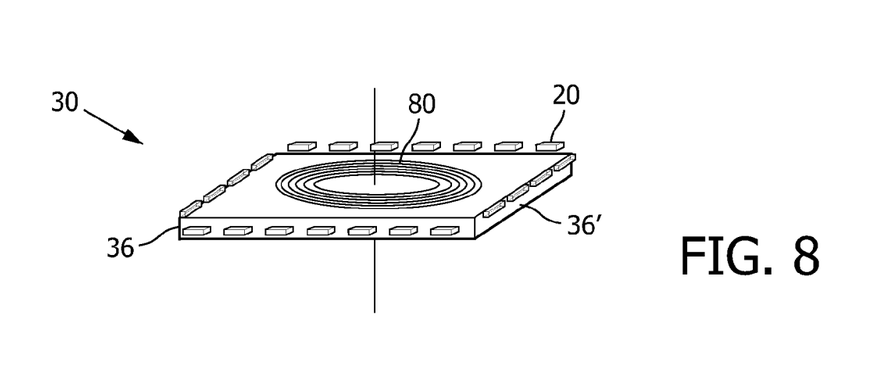

As shown in the FIGS. 7 and 8 the illuminating device 10 may comprise a plurality of lighting elements 20. Preferably those lighting elements 20 are arranged adjacent to the side faces 36, 36'. In FIG. 7 the lighting elements 20 are arranged in two rows, facing each other on the side faces 36, 36'. Another embodiment is shown in FIG. 8, where the lighting elements 20 are bordering the whole illumination body 30. Due to the fact, that the needed total light flux is not emitted by one but a plurality of lighting elements 20 the individual light output and therefore the size of each lighting elements 20 can be reduced. Therefore a lean design of the illuminating device 10 respectively illuminating body 30 is realized.

Figure 9:
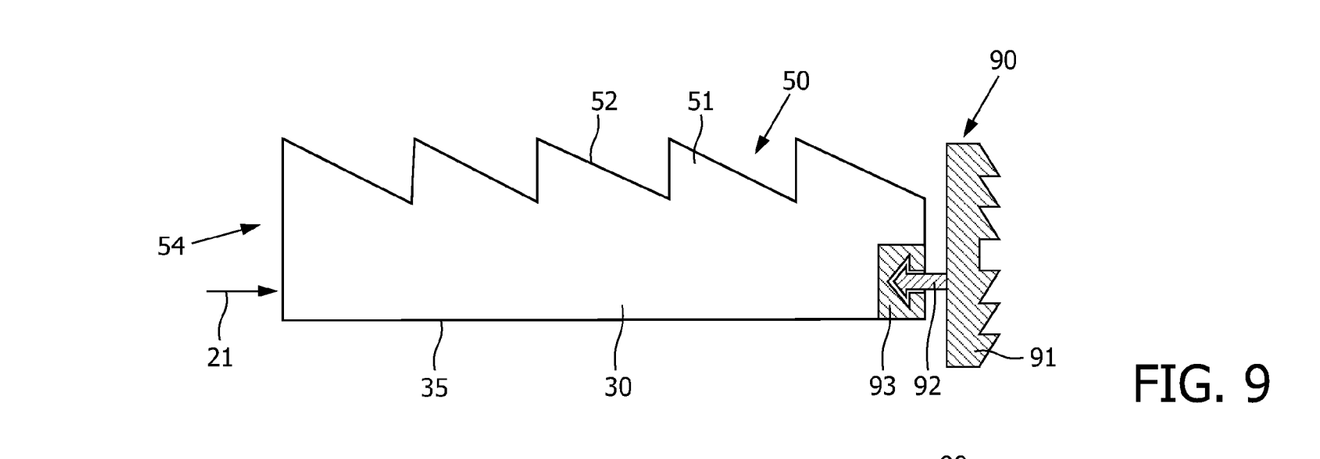
FIG. 9 shows the illuminating body with condensor element.

To achieve the ability to use the illumination device 10 as a torch, a condensor element 90 is disclosed. In FIG. 9 a cross section of the condensor element 90 is shown, which is connected to a longitudinal side 36 of the illuminating body 30. Artificial light 21, being injected into the illuminating body 30, and being not or just marginally deflected by the light extraction layer 50, may leave the illuminating body 30 without illuminating the surface 101 as intended. To use this part of the artificial light 21 the condensor element 90 comprises a light conductive material, configured to receive and to direct at least a part of the artificial light 21. Therefore, the condensor element 90 comprises a surface formation 91, which possesses in the shown example a saw tooth like structure. This surface formation 91 may also form a Fresnel-type lens, to focus the artificial light leaving the condensor element 90. Furthermore, the condensor element 90 may comprise a clip means 92, wherein the clip means 92 is concurring with a second clip means 93 of the illuminating body 30. Through a connection of the clip means 92 with the second clip means 93 the condensor element 90 is reversibly attachable to the illuminating body 30.

Figure 10:
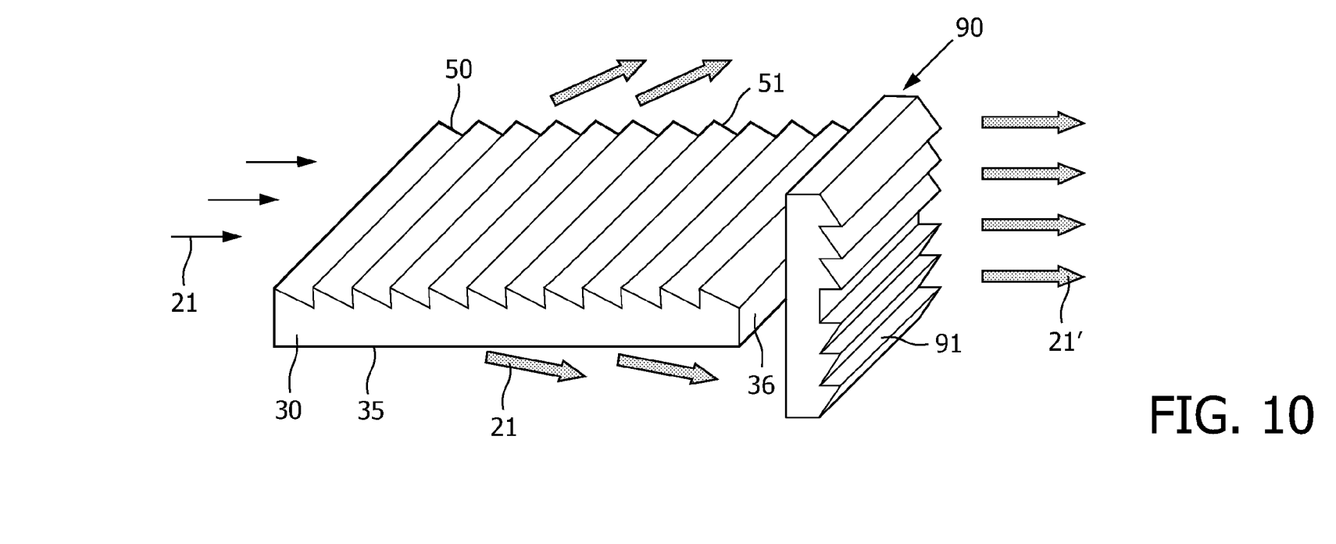
FIG. 10 shows a further embodiment of the illuminating body with the condensor element.

In FIG. 10 the effect of the condensor element 90 is shown. Artificial light 21 is entering the illuminating body 30 from the left side. Parts of the artificial light 21 will penetrate the light extraction layer 50 and leave the illuminating body 30 through its top side. Other parts of the artificial light 21 will marginally be deflected by the light extraction layer 50 and leave the illuminating body 30 through the bottom surface 35 under a small angle. A third part of the artificial light 21 will leave the illuminating body 30 through the side face 36. The last named part and—depending on the size of the condensor element 90—a fraction of the last but one named part of the artificial light 21 will therefore enter the condensor element 90. As the condensor element 90 comprises a light conductive material the artificial light 21 will not be attenuated. The outer surface of the condensor element 90 comprises a surface formation 91, configured to receive and to deflect the collected artificial light 21. The surface formation 91 possesses the ability to shape the flux of artificial light 21', leaving the condensor element 90 to a focused or—as shown here—a parallel flux. Therefore, the illumination device 10 can be used as a torch.

The disclosed illumination device 10 has the advantage, that it is able to illuminate and optical magnify the surface 101 at the same time. A potential user looks through the illuminating body 30 comprising the surface pattern 80, forming the Fresnel-type lens. To ensure that the surface 101 is always uniformly illuminated another embodiment of the invention discloses that the illumination device 10 comprises at least a first lighting means 110 and a second lighting means 120, wherein the first lighting means 110 and the second lighting means 120 are arranged to illuminate at least partially different section 102, 102' of the surface 101. This embodiment makes use of at least two lighting means which are installed at variable distances from a center 84 of the Fresnel-type lens. To clarify the positions of the first respectively second lighting means, the center 84 of the Fresnel-type lens is marked in FIG. 10. Through the positioning of the first 110 and the second lighting means 120 at different distances from the center 84 of the lens, the surface 101 will always be uniformly illuminated, independent of the distance of the illuminating body 30 with respect to the object 100.

Figure 11:
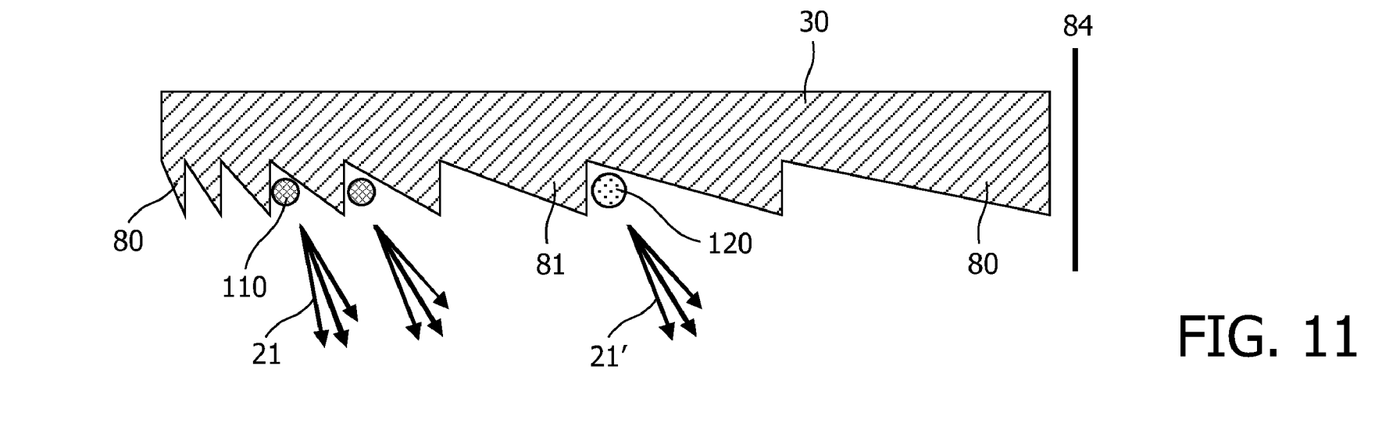
FIG. 11 shows the illuminating body with a first lighting means and a second lighting means.

In FIG. 11 a cross sections of a part of the illuminating body 30 is shown. The center of the lens 84 is schematically pictured as a vertical line. The first lighting means 110 is formed by two optical fibers embedded within two refractor means 81 of the surface pattern 80. Also the second lighting means 120 is formed by one optical fiber embedded within another refractor means 81 of the illuminating body 30. The position of the second lighting means 120 is nearer to the center 84 of the Fresnel-type lens than the position of the first lighting means 110. The artificial light 21, 21' emitted by the first 110 respectively second lighting means 120 is generated within the lighting element 20 and injected into the optical fibers. Last named transport the artificial light 21, 21' and allow a controlled out coupling of the artificial light 21, 21' towards the direction of the object 100. Each of the optical fibers forming the first respectively the second lighting means 110, 120 may be connected with an individual lighting element 20. The user may activate the desired lighting element 20 by a push button. Depending on the distance of the illumination device 10 to the surface 101 the user may choose between the two lighting elements 20, each of which are connected to the lighting means 110, 120 to achieve a uniform illumination of the surface 101.

Figure 12:
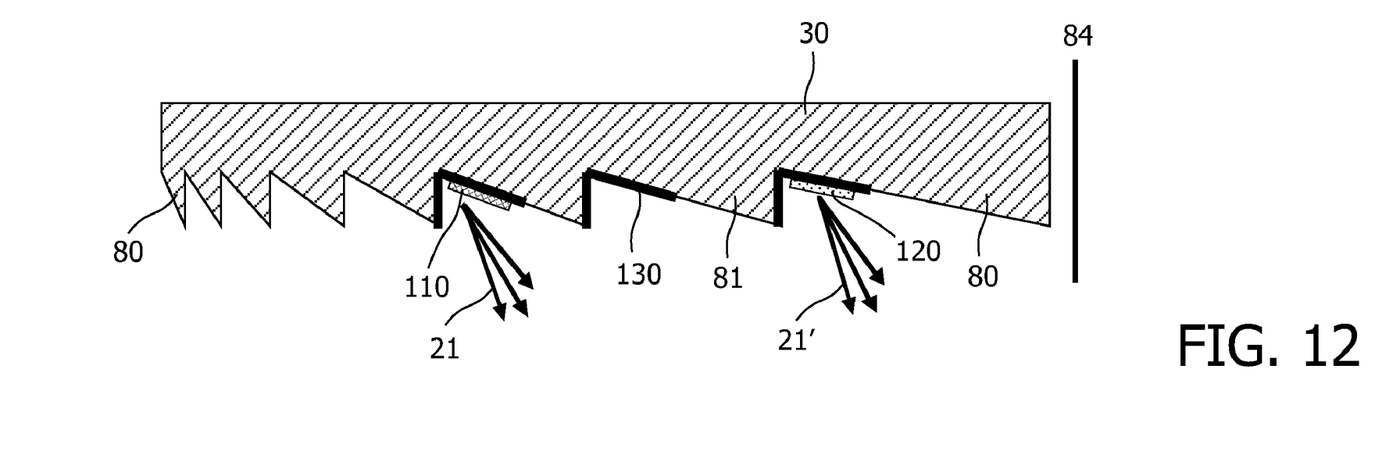
FIG. 12 shows a further embodiment of the first and second lighting means.

In FIG. 11 the first 110 and the second lighting means 120 are formed by a plurality of optical fibers. Optical fibers possess the advantage, that they can easily be embedded within the groves forming the refractor means 81 of the Fresnel-type lens. Furthermore, optical fibers possess a tiny diameter and can be positioned far away from the center 84 of the lens. Additionally, the lighting element 20, generating the artificial light 21, 21' may even be remotely placed with respect to the illuminating body 30. In an alternative embodiment shown in FIG. 12 the first and the second lighting means 110, 120 are not formed by optical fibers but by light sources. To achieve this aim the first lighting means 110 and/or second lighting means 120 are the lighting element itself. Therefore, artificial light 21, 21' is only produced by the first respectively second lighting means 110, 120. Again both lighting means 110, 120 may be positioned on the surface of the illuminating body 30 formed by the refractor means 81. Additionally, the first and second lighting means 110, 120 are mounted on a reflecting means 130. The reflecting means 130 has the advantage to prevent glare. Artificial light 21, 21' which does not propagate towards the object 100 may enter the illuminating body 30 and therefore irritate a user of the illumination device 10. To prevent this, the reflecting means 130 reflects the artificial light 21, 21' in such a way, that only the object 100 is illuminated. The reflecting means 130 may be formed by a mirror and/or reflective coating.

Figure 13:
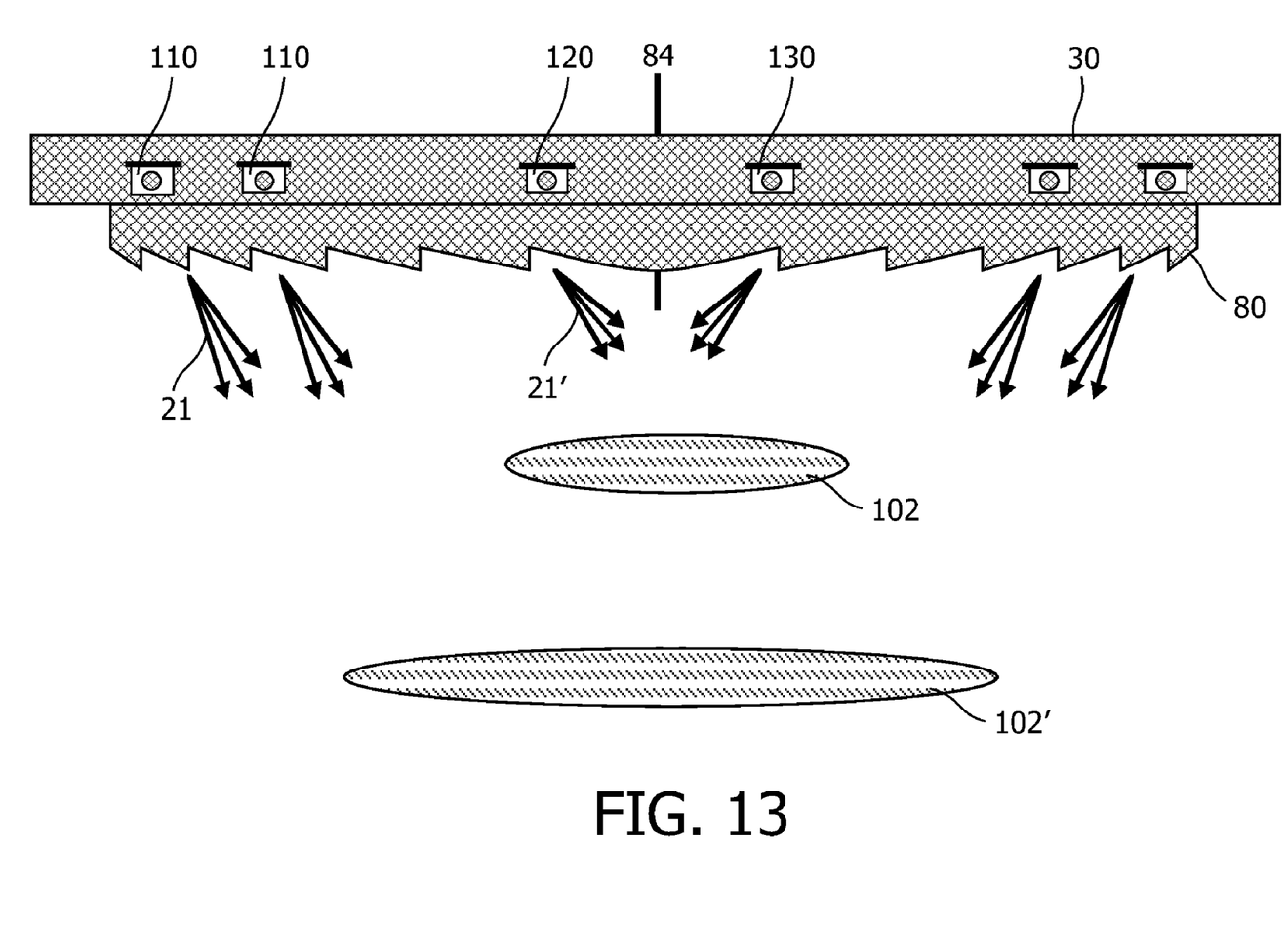
FIG. 13 shows another embodiment of the illuminating body with the embedded first and second lighting means.

In FIG. 13 another embodiment of the illumination device 10 is shown. In this embodiment the first 110 and second lighting means 120 are formed by optical fibers, which are embedded in the illuminating body 30 using low reflective index adhesive. To prevent glare the optical fibers are shielded by the reflecting means 130 which are formed by a foil like sheet mounted on top of the optical fibers. FIG. 13 illustrates the ability of the modified illumination device 10 to illuminate at least partially different sections 102, 102' of the surface 101. Depending on a distance of the illumination device 10 to the surface 101 a user may choose to activate only the first lighting means 110. The artificial light 21 emitted by a lighting element 20 is injected into the lighting means 110 and emitted in such a way, that a large section 102 of the surface 101 is illuminated. Does the user decide to decrease the distance of the illumination device 10 with respect to the surface 101, the field of view of the user may not be uniformly illuminated anymore. Especially towards the center 84 of the lens the light flux may decrease. Therefore, the user may either additionally or alternatively activate a second lighting element injecting the artificial light 21' into the second lighting means 120. This artificial light 21' illuminates a partially different section 102 of the surface 101. Therefore, a user has still a uniform illumination of the spot of the surface 101 with the help of the illumination device 10.

The first 110 and second lighting means 120 may simultaneously form cavities being filled with luminescent material in order to modify the color of light emitted from the lighting means 110 and 120. Organic luminescent material such as Lumogen from BASF is a preferred luminescent material, because organic material can be easily dispersed in the lighting means and/or the illuminating body 30. The illuminating body may comprise cavities filled with luminescent material apart from the lighting means 110 and 120. Light emitted from the luminescent material within these cavities should not reach the user directly in order not to disturb the view of the illuminated object 100. Therefore, it is preferred to cover the cavities with a reflective layer on the side facing towards the user in order to reflect the light emitted towards the user back to the object 100 to be illuminated

LIST OF NUMERALS

- 10 illumination device
- 15 illumination gap
- 20 lighting element
- 21,21' artificial light
- 30 illuminating body
- 33 width of the illuminating body 30
- 34 top surface of the illuminating body 30
- 35 bottom surface of the illuminating body 30
- 36,36' side face of the illuminating body 30
- 37 first section
- 38 second section
- 40 housing element
- 50 light extraction layer
- 51 deflection means
- 52 face of the deflection means 51
- 53 flange of the deflection means 51
- 54 angel of the light extraction layer
- 60 solar cell
- 61 battery
- 62 driver
- 80 surface pattern
- 81 refractor means
- 82 facet of the refractor means 81
- 83 flange of the refractor means 81
- 84 centre of the Fresnel-type lens
- 100 object
- 101 surface of object 100
- 102,102' section of surface 101
- 110 first lighting means
- 120 second lighting means
- 130 reflecting means

The invention claimed is:

1. An illumination device for both visually magnifying and illuminating a surface, the device comprising:
    at least one lighting element for emitting artificial light,
    a housing element for supporting said lighting element;
    an illuminating body extending outward from and supported by said housing, said illuminating body comprised of a transparent light conductive material suitable for illuminating and magnifying an adjacent area,
    wherein said illuminating body includes a plurality of surface patterns forming a Fresnel-type lens;
    wherein said illuminating body includes said Fresnel-type lens to optically magnify said adjacent area, said magnified adjacent area viewable through a rear surface of said illuminating body, and
    wherein said illuminating body receives said artificial light and redirects said light to illuminate said adjacent area viewable through said Fresnel-type lens, said fresnel-type lens formed by said plurality of surface patterns on a front surface of said illuminating body, said surface patterns redirecting said artificial light away from said rear surface and through said front surface;
    said illuminating body further having a side face positioned between said front surface and said rear surface, said lighting element injecting light into said illuminating body through said side face;
    said illuminating body further including a light extraction layer on said rear surface, said light extraction layer configured to receive and to deflect said artificial light from said lighting element onto said surface.

2. An illumination device according to claim 1, wherein the surface pattern comprises a plurality of refractors.

3. An illumination device according to claim 2, wherein each refractors is configured to optically magnify the surface and/or to receive and to deflect the artificial light from the lighting element onto the surface.

4. An illumination device according to claim 1, wherein the surface pattern is at least partially transparent for the artificial light reflected to the surface, and for an ambient light, falling onto the surface pattern through said rear surface of said illuminating body.

5. An illumination device according to claim 1, wherein the lighting element is arranged beneath the illuminating body.

6. An illumination device according to claim 1, wherein said illuminating body includes a first section and a second section, wherein at least a part of the first section is covered with the surface pattern, and wherein at least a part of the second section is covered with the light extraction layer.

7. An illumination device according to claim 1, comprising a plurality of lighting elements, arranged adjacent to said side faces of the illuminating body.

8. An illumination device according to claim 1, further comprising a condensor element arranged on a longitudinal side of the illumination body and configured to receive and to direct at least a part of the artificial light leaving the illuminating body.

9. An illumination device according to claim 8 wherein the condensor element comprises a saw-tooth surface formation having a formation angle ranging between 0.1° and 5°.

10. An illumination device according to claim 8, wherein the condensor element is reversibly attachable to the illuminating body.

11. An illumination device according to claim 8 wherein the condensor element comprises a changeable lens element formed by a LC (liquid crystal) structure.

12. An illumination device according to claim 1, further comprising at least a first light emitter and a second light emitter arranged to illuminate at least partially different sections of the surface.

13. An illumination device according to claim 12, wherein the first light emitter and the second light emitter are arranged between said surface patterns on said illuminating body.

14. An illumination device according to claim 12, wherein the first light emitter and the second light emitter are arranged within said illuminating body.

15. An illumination device according to claim 12 wherein the first light emitter and/or the second light emitter are optical fibers doped for shifting the wavelength of the artificial light by absorption and reemission.

16. An illumination device according to claim 12, further comprising at least one reflector positioned so as to reflect said artificial light arranged adjacent to the first light emitter and/or the second light emitter.

* * * * *